(12) United States Patent
Viitanen

(10) Patent No.: US 8,644,043 B2
(45) Date of Patent: Feb. 4, 2014

(54) SWITCHING BRANCH FOR THREE-LEVEL RECTIFIER AND METHOD FOR CONTROLLING SWITCHING BRANCH FOR THREE-LEVEL RECTIFIER

(75) Inventor: Tero Viitanen, Vantaa (FI)

(73) Assignee: ABB Oy, Helsinki (FI)

( * ) Notice: Subject to any disclaimer, the term of this patent is extended or adjusted under 35 U.S.C. 154(b) by 169 days.

(21) Appl. No.: 13/275,844

(22) Filed: Oct. 18, 2011

(65) Prior Publication Data

US 2012/0092914 A1   Apr. 19, 2012

(30) Foreign Application Priority Data

Oct. 18, 2010   (EP) .................................... 10187837

(51) Int. Cl.
*H02M 7/217*   (2006.01)
*H02M 7/06*    (2006.01)

(52) U.S. Cl.
USPC .......................................... 363/127; 363/126

(58) Field of Classification Search
USPC ..................... 363/84, 89, 125–127
See application file for complete search history.

(56) References Cited

U.S. PATENT DOCUMENTS

| | | | | |
|---|---|---|---|---|
| 5,400,242 | A * | 3/1995 | Ando et al. | 363/136 |
| 5,956,243 | A * | 9/1999 | Mao | 363/61 |
| 7,751,212 | B2 * | 7/2010 | Perkinson | 363/127 |
| 8,138,638 | B2 * | 3/2012 | Mallwitz et al. | 307/151 |
| 2002/0149953 | A1 * | 10/2002 | Smedley et al. | 363/84 |
| 2003/0128563 | A1 * | 7/2003 | Rojas Romero | 363/89 |
| 2006/0215425 | A1 * | 9/2006 | Fu et al. | 363/37 |
| 2008/0298103 | A1 * | 12/2008 | Bendre et al. | 363/89 |
| 2010/0302821 | A1 * | 12/2010 | Luo | 363/126 |
| 2011/0109162 | A1 * | 5/2011 | Rizet et al. | 307/66 |
| 2012/0020137 | A1 * | 1/2012 | Abe | 363/132 |
| 2012/0257430 | A1 * | 10/2012 | Truettner | 363/131 |
| 2013/0076293 | A1 * | 3/2013 | Chen et al. | 318/729 |

OTHER PUBLICATIONS

J. W. Kolar et al., "A Novel Three-Phase Utility Interface Minimizing Line Current Harmonics of High-Power Telecommunications Rectifier Modules", IEEE Transactions on Industrial Electronics, Aug. 1997, pp. 367-374, vol. 44, No. 4.

Y. Zhao et al., "Force Commutated Three Level Boost Type Rectifier", IEEE Transactions on Industry Applications, Jan./Feb. 1995, pp. 155-161, vol. 31, No. 1.

(Continued)

*Primary Examiner* — Timothy J Dole
*Assistant Examiner* — Yusef Ahmed
(74) *Attorney, Agent, or Firm* — Buchanan Ingersoll & Rooney PC

(57) ABSTRACT

A switching branch for a three-level rectifier and a method for controlling a switching branch for a three-level rectifier are provided. The switching branch includes a first diode and a second diode connected in series, a third diode and a fourth diode connected in series, a first controllable switch connected between a neutral DC output pole and a connection point between the first and the second diode, and a second controllable switch connected between the neutral DC output pole and a connection point between the third and the fourth diode. The switching branch controls the first controllable switch to be in a conductive state during a reverse blocking state of the first diode and the second diode, and controls the second controllable switch to be in a conductive state during a reverse blocking state of the third diode and the fourth diode.

18 Claims, 1 Drawing Sheet

(56) References Cited

OTHER PUBLICATIONS

Brückner et al., "Loss Balancing in Three-Level Voltage Source Inverters Applying Active NPC Switches" 32nd Annual IEEE Power Electronics Specialists Conference, PESC 2001, vol. 2, pp. 1135-1140.

Kolar et al., "A novel Three-Phase Utility Interface Minimizing Line Current Harmonics of High-Power Telecommunications Rectifier Modules" IEEE Transactions on Industrial Electronics, (1997), vol. 44, No. 4, pp. 456-467.

Miniböck et al., "Comparative Theoretical and Experimental Evaluation of Bridge Leg Topologies of a Three-Phase Three-Level Unity Power Factor Rectifier" 32nd Annual IEEE Power Electronics Specialists Conference, PESC 2001, vol. 3, pp. 1641-1646.

Round et al., "Towards a 30 kW/liter, Three-Phase Unity Power Factor Rectifier" Fourth Power Conversion Conference, (Apr. 2007), pp. 1251-1259.

Winkelnkemper et al., Control of a 6MVA Hybrid Converter for a Permanent Magnet Synchronous Generator for Windpower Proceedings of the 2008 International Conference on Electrical Machines, (2008), pp. 1-6.

The extended European Search Report dated Mar. 16, 2012, issued in the corresponding European Patent Application No. 10187837.9. (6 pages).

\* cited by examiner

US 8,644,043 B2

SWITCHING BRANCH FOR THREE-LEVEL RECTIFIER AND METHOD FOR CONTROLLING SWITCHING BRANCH FOR THREE-LEVEL RECTIFIER

RELATED APPLICATION

This application claims priority under 35 U.S.C. §119 to European Patent Application No. 10187837.9 filed in Europe on Oct. 18, 2010, the entire content of which is hereby incorporated by reference in its entirety.

FIELD

The present disclosure relates to a switching branch for a three-level rectifier, and to a method for controlling a switching branch for a three-level rectifier.

BACKGROUND

Three-level rectifiers are rectifiers that have three DC outputs. In addition to the positive and negative DC outputs, they have a neutral DC output. Examples of three-level rectifiers are given in J. W. Kolar and F. C. Zach, "A Novel Three-Phase Utility Interface Minimizing Line Current Harmonics of High-Power Telecommunications Rectifier Modules", IEEE Transactions on Industrial Electronics, Vol. 44, No. 4, August 1997, and in Y. Zhao, Y. Li and T. A. Lipo, "Force Commutated Three Level Boost Type Rectifier", IEEE Transactions on Industry Applications, Vol. 31, No. 1, January/February 1995.

FIG. 1 shows an example of a switching branch for a three-level rectifier which includes six diodes D1 to D6 and two controllable switches S1, S2. The switches are controlled via a control arrangement 10 according to a particular modulation scheme. Possible modulation methods are vector modulation and hysteresis modulation, for example. When current flows towards the rectifier from an AC input pole of the rectifier branch, the first switch S1 is modulated, and the first diode D1 and the first switch S1 commutate with each other according to the modulation scheme used. In a corresponding manner, when the current flows away from the rectifier, the second switch S2 is modulated, and the fourth diode D4 and the second switch S2 commutate with each other according to the modulation scheme used. A rectifier configuration may also include an AC filter, which may be, for example, of L-type or LCL-type and which is connected between the rectifier input pole(s) and corresponding poles of the supplying AC voltage source.

However, in the above-described example, there is an uneven distribution of voltage across components in a reverse blocking state. A reason for this may be impedance differences due to different component characteristics, component manufacturing or circuit configuration. In the example of FIG. 1, when the third and fourth diodes D3 and D4 are in the reverse blocking state and if a reverse impedance of the fourth diode D4 is higher than the reverse impedance of the third diode D3, the voltage across the fourth diode D4 tends to be higher than the voltage across the third diode D3. However, the sixth diode D6 connected in parallel with the second switch S2 guarantees that the voltage across the fourth diode D4 is at most the same as the potential of the neutral DC output NP because the sixth diode D6 then connects the connection point of the third and fourth diodes D3 and D4 directly to the neutral DC output NP. On the other hand, if the reverse impedance of the third diode D3 is higher than the reverse impedance of the fourth diode D4 and the voltage across the third diode D3 tends to be higher than the voltage across the fourth diode D4, the sixth diode D6 stays in a reverse blocking state and does not limit the voltage across the third diode D3. Therefore, in the worst case, the third diode D3 may be exposed to the total voltage Udc of the DC intermediate circuit. In a similar manner, when the first and second diodes D1 and D2 are in the reverse blocking state, the second diode D2 may be exposed to the total voltage Udc of the DC intermediate circuit. This is not desirable.

A solution to the problem described above is to connect additional resistors in parallel with the series-connected diodes D1 to D4 to balance the distribution of voltage across the diodes. However, such additional components cause additional costs and also additional losses.

SUMMARY

An exemplary embodiment of the present disclosure provides a switching branch for a three-level rectifier. The exemplary switching branch includes a first diode and a second diode connected in series between an AC input pole of the switching branch and a positive DC output pole. The exemplary switching branch also includes a third diode and a fourth diode connected in series between the AC input pole of the switching branch and a negative DC output pole. In addition, the exemplary switching branch includes a first controllable switch connected between a neutral DC output pole and a first connection point between the first diode and the second diode. The exemplary switching branch also includes a second controllable switch connected between the neutral DC output pole and a second connection point between the third diode and the fourth diode. Furthermore, the exemplary switching branch includes means for controlling the first controllable switch to be in a conductive state during a reverse blocking state of the first diode and the second diode, and means for controlling the second controllable switch to be in a conductive state during a reverse blocking state of the third diode and the fourth diode.

An exemplary embodiment of the present disclosure provides a method for controlling a switching branch for a three-level rectifier. The switching branch includes a first diode and a second diode connected in series between an AC input pole of the switching branch and a positive DC output pole, a third diode and a fourth diode connected in series between the AC input pole of the switching branch and a negative DC output pole, a first controllable switch connected between a neutral DC output pole and a first connection point between the first and the second diode, and a second controllable switch connected between the neutral DC output pole and a second connection point between the third and the fourth diode. The exemplary method includes controlling the first controllable switch to be in a conductive state during a reverse blocking state of the first diode and the second diode, and controlling the second controllable switch to be in a conductive state during a reverse blocking state of the third diode and the fourth diode.

An exemplary embodiment of the present disclosure provides a non-transitory computer-readable recording medium having a computer program recorded thereon that causes a processor of a computing device to carry out operations for controlling a switching branch for a three-level rectifier. The switching branch includes a first diode and a second diode connected in series between an AC input pole of the switching branch and a positive DC output pole, a third diode and a fourth diode connected in series between the AC input pole of the switching branch and a negative DC output pole, a first controllable switch connected between a neutral DC output pole and a first connection point between the first and the second diode, and a second controllable switch connected between the neutral DC output pole and a second connection point between the third and the fourth diode. The program causes the processor to carry out operations which include controlling the first controllable switch to be in a conductive state during a reverse blocking state of the first diode and the second diode, and controlling the second controllable switch to be in a conductive state during a reverse blocking state of the third diode and the fourth diode.

An exemplary embodiment of the present disclosure provides a switching branch for a three-level rectifier. The exemplary switching branch includes a first diode and a second diode connected in series between an AC input pole of the switching branch and a positive DC output pole, and a third diode and a fourth diode connected in series between the AC input pole of the switching branch and a negative DC output pole. The exemplary switching branch also includes a first controllable switch connected between a neutral DC output pole and a first connection point between the first diode and the second diode, and a second controllable switch connected between the neutral DC output pole and a second connection point between the third diode and the fourth diode. Moreover, the exemplary switching branch includes a control arrangement configured to control the first controllable switch to be in a conductive state during a reverse blocking state of the first diode and the second diode, and to control the second controllable switch to be in a conductive state during a reverse blocking state of the third diode and the fourth diode.

BRIEF DESCRIPTION OF THE FIGURES

Additional refinements, advantages and features of the present disclosure are described in more detail below with reference to exemplary embodiments illustrated in the drawings, in which.

DETAILED DESCRIPTION

Exemplary embodiments of the present disclosure provide a method for controlling a switching branch for a three-level rectifier, and a switching branch for a three-level rectifier which solve the above-described drawbacks. Exemplary embodiments also provide a non-transitory computer-readable recording medium having a computer program recorded thereon that causes a processor of a computing device to carry out the exemplary method.

Exemplary embodiments of the present disclosure are based on the idea of setting each controllable switch of the switching branch in a conducting state during the time when the switch is not modulating the input voltage of the switching branch. According to an exemplary embodiment, this may be accomplished by setting the first switch of the switching branch to be in a conductive state during the reverse blocking state of the first diode and the second diode, for example, when the AC input pole of the switching branch is connected to the negative output pole, and by setting the second switch of the switching branch to be in a conductive state during the reverse blocking state of the third diode and the fourth diode, for example, when the AC input pole of the switching branch is connected to the positive output pole. The conducting switch connects the neutral DC output potential to the connection point of the diodes in the reverse blocking state and thus the voltage stress of the diodes in the reverse blocking state is always at most about half the total voltage of the DC intermediate circuit.

In accordance with an exemplary embodiment, by controlling the switches into a conductive state when they are not modulating the input voltage of the rectifier, the voltages across the diodes in the reverse blocking state can be balanced without the use of any additional components such as resistors. This results in lower power losses and overall costs.

The application of the present disclosure is not limited to any specific system, but it can be used in connection with various electric systems. Moreover, the use of the present disclosure is not limited to systems employing any specific fundamental frequency or any specific voltage level.

Figure 1:
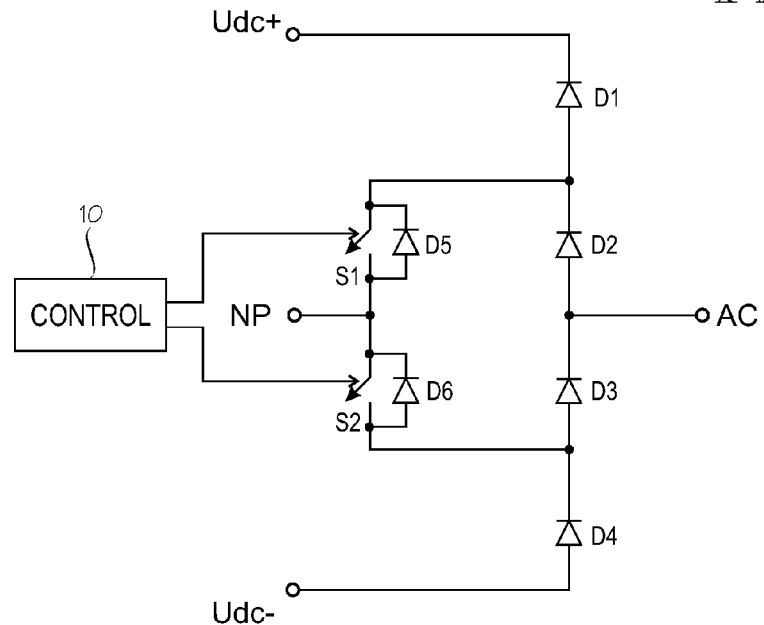
FIG. 1 illustrates a circuit diagram of a rectifier switching branch according to an exemplary embodiment of the present disclosure.

FIG. 1 shows an example of a switching branch for a three-level rectifier according to an exemplary embodiment of the present disclosure. FIG. 1 shows only components necessary for understanding the features of the present disclosure. It should be noted that the switching branch configuration could differ from the one shown in FIG. 1 without deviating from the basic idea of the present disclosure. The switching branch includes a first diode D1 and a second diode D2 connected in series between a positive DC output pole Udc+ and an AC input pole AC of the switching branch. The switching branch further includes a third diode D3 and a fourth diode D4 connected in series between the AC input pole AC of the switching branch and a negative DC output pole Udc−. In addition, the switching branch includes a first controllable switch S1 connected between a neutral DC output pole NP and a connection point between the first and the second diode, and a second controllable switch S2 connected between the neutral DC output pole NP and a connection point between the third and the fourth diode. The switches S1, S2 can be semiconductor switches such as IGBT (Insulated Gate Bipolar Transistor) or FET (Field-Effect Transistor) or any corresponding controllable switches. The exemplary switching branch illustrated in FIG. 1 also includes a control arrangement 10 via which the switches S1, S2 can be controlled. In accordance with an exemplary embodiment, the normal operation of the rectifier includes pulse width modulation (PWM) of the rectifier input voltage by the switches S1, S2 according to a certain modulation method. This may be a vector modulation or a hysteresis modulation method, for example. The present disclosure is not, however, limited to any specific modulation method. The modulation control can involve one or more additional control components. The exemplary switching branch of FIG. 1 can also include a fifth diode D5 connected in parallel with the first switch S1 and a sixth diode D6 connected in parallel with the second switch S2. These fifth and sixth diodes D5, D6 are entirely optional and may be omitted in some configurations. The switching branch configuration can also include an AC filter, which may be, for example, of L-type or LCL-type, that is connected between the AC input pole and a corresponding pole of a supplying AC voltage source.

According to an exemplary embodiment, each switch of the switching branch is set into a conducting state during the time when the switch is not modulating the input voltage of the switching branch. This can be carried out, for example, by controlling the first switch S1 of the switching branch to be in a conductive state during a reverse blocking state of the first diode D1 and the second diode D2, and controlling the second switch S2 of the switching branch to be in a conductive state during a reverse blocking state of the third diode D3 and the fourth diode D4. The reverse blocking state of both the first diode D1 and the second diode D2 occurs when the AC input pole AC of the switching branch is connected to the negative DC output pole Udc− potential, and can be determined, for example, on the basis of the direction of the current through the AC input pole AC. In a similar manner, the reverse blocking state of both the third diode D3 and the fourth diode D4 occurs when the AC input pole AC of the switching branch is connected to the positive DC output pole Udc+ potential, and can be determined, for example, on the basis of the direction of the current through the AC input pole AC.

The AC input pole of the switching branch can be connected to the neutral DC output pole NP potential by controlling the appropriate active switch according to the current polarity. Thus, the other switch which is not carrying the branch current can remain in the conducting state without any effect on the AC input voltage or current. This means that the switch, which is used for balancing the voltages across the diodes in the reverse blocking state, can stay in the conductive state continuously as long as the diodes to be balanced remain in the reverse blocking state. According to an exemplary embodiment, the first switch S1 of the switching branch is controlled to be in the conductive state for each entire period of the reverse blocking state of the first diode D1 and the second diode D2, and the second switch S2 of the switching branch is controlled to be in the conductive state for each entire period of the reverse blocking state of the third diode D3 and the fourth diode D4. In other words, according to this exemplary embodiment, the first switch S1 of the switching branch is set to be in the conductive state whenever both the first diode D1 and the second diode D2 are in the reverse blocking state, and the second switch S2 of the switching branch is set to be in the conductive state whenever both the third diode D3 and the fourth diode D4 are in the reverse blocking state.

Figure 2:
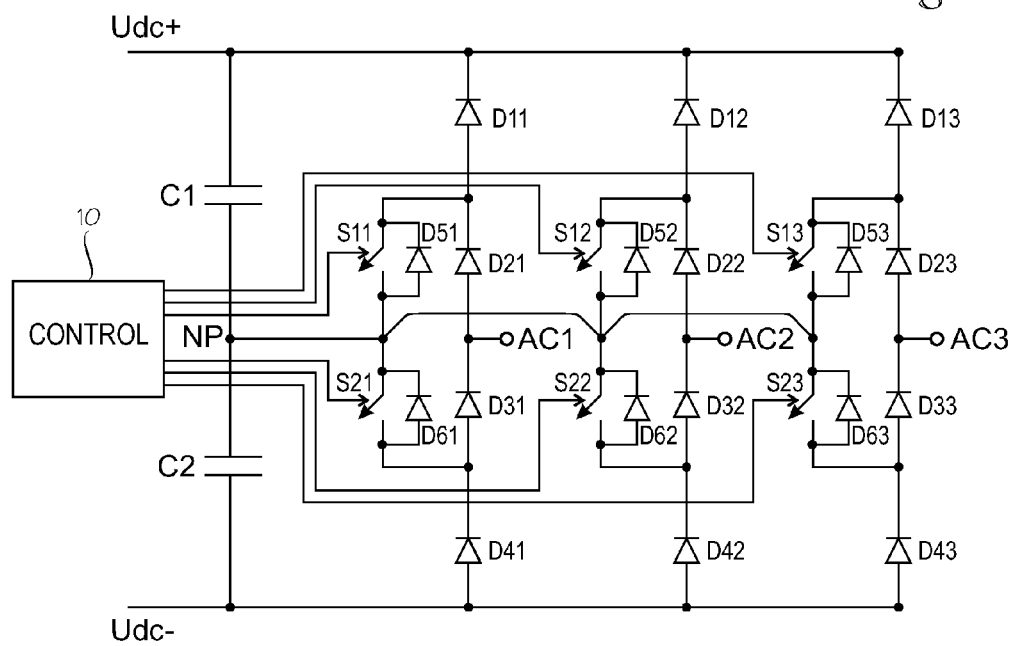
FIG. 2 illustrates a circuit diagram of a rectifier according to an exemplary embodiment of the present disclosure.

According to an exemplary embodiment, a three-phase three-level rectifier can be implemented by connecting together three switching branches as described above. FIG. 2 illustrates a circuit diagram of a rectifier according to an exemplary embodiment including three switching branches corresponding to that of FIG. 1. The three switching branches have been connected together by connecting the positive DC output poles Udc+ of each switching branch together, the negative DC output poles Udc− of each switching branch together, and the neutral DC output poles NP of each switching branch together. FIG. 2 shows only components necessary for understanding the present disclosure. It should be noted that the rectifier circuit configuration could differ from the one shown in FIG. 2 without deviating from the basic idea of the present disclosure. The exemplary three-phase rectifier thus includes three switching branches with AC input poles AC1, AC2 and AC3, respectively, for connecting the rectifier to the phases of a three phase AC supply. The rectifier configuration can also include an AC-filter, which may be, for example, of L-type or LCL-type, that is connected between the rectifier input poles and the corresponding poles of the supplying AC-voltage source. Each switching branch includes a first diode D11, D12, D13 and a second diode D21, D22, D23 connected in series between a positive DC output pole Udc+ of the rectifier and an AC input pole of the switching branch AC1, AC2, AC3. Each switching branch further includes a third diode D31, D32, D33 and a fourth diode D41, D42, D43 connected in series between the AC input pole of the switching branch AC1, AC2, AC3 and a negative DC output pole Udc− of the rectifier. In addition, each switching branch includes a first controllable switch S11, S12, S13 connected between a neutral DC output pole NP of the rectifier and a connection point between the first and the second diode, and a second controllable switch S21, S22, S23 connected between the neutral DC output pole NP of the rectifier and a connection point between the third and the fourth diode. The switches S11, S12, S13, S21, S22, S23 can be semiconductor switches such as IGBT (Insulated Gate Bipolar Transistor) or FET (Field-Effect Transistor) or any corresponding controllable switches. FIG. 2 also shows a control arrangement 10 via which the switches can be controlled. In accordance with an exemplary embodiment, the normal operation of the rectifier includes pulse width modulation (PWM) of the rectifier input voltage by the switches S11, S12, S13, S21, S22, S23 according to a certain modulation method. This may be a vector modulation or a hysteresis modulation method, for example. The present disclosure is not, however, limited to any specific modulation method. The modulation control can involve one or more additional control components possibly included in the rectifier. Each switching branch of the exemplary rectifier of FIG. 2 can further include a fifth diode D51, D52, D53 connected in parallel with the first switch S11, S12, S13 of each switching branch, and a sixth diode D61, D62, D63 connected in parallel with the second switch S21, S22, S23 of each switching branch. These fifth and sixth diodes are entirely optional and may be omitted in some configurations. The DC intermediate circuit of the exemplary rectifier of FIG. 2 can include capacitors C1 and C2 as shown. The structure of the intermediate circuit could also be different, depending on the circuit configuration used. The first switch S11, S12, S13 and the second switch S21, S22, S23 of each switching branch can be controlled in a manner similar to that described above in connection with the switching branch of FIG. 1.

The control of the switches S1, S11, S12, S13, S2, S21, S22, S23 according to the various embodiments described above can be performed by or via the control arrangement 10 (e.g., means for controlling) which can also perform the normal modulation control of the switches. It is also possible to use additional or separate logical of physical units (not shown) for performing the control functionality of the present disclosure. The functionality of the present disclosure could, for example, be implemented using a separate logic arrangement which could be independent of the normal modulation control of the switches, for example.

The control arrangement 10 and/or a separate logic arrangement controlling the switches S1, S11, S12, S13, S2, S21, S22, S23 according to any one of the above embodiments, or a combination thereof, can be implemented as one unit or as two or more separate units that are configured to implement the functionality of the various embodiments. Here the term 'unit' refers generally to a physical or logical entity, such as a physical device or a part thereof or a software routine. The control arrangement 10 according to any one of the embodiments may be implemented at least partly by means of one or more computers or corresponding digital signal processing (DSP) equipment which are configured to execute suitable software, for example. Such a computer or digital signal processing equipment can include a non-transitory computer-readable recording medium (e.g., ROM, hard disk drive, optical memory, flash memory, etc.) for tangibly storing a computer program to be executed by a processor of the computer or digital signal processing equipment, a working memory (RAM) providing a storage area for arithmetical operations and a central processing unit (CPU), such as a general-purpose digital signal processor. The CPU may comprise a set of registers, an arithmetic logic unit, and a CPU control unit. The CPU control unit is controlled by a sequence of program instructions transferred to the CPU from the RAM, ROM and/or hard disk. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the present disclosure, or a part thereof, may further include suitable input means for receiving, for example, measurement and/or control data, and output means for outputting, for example, control data. It is also possible to use a specific integrated circuit or circuits, or discrete electric components and devices for implementing the functionality according to any one of the embodiments.

The present disclosure can be implemented in existing system elements or by using separate dedicated elements or devices in a centralized or distributed manner. Present rectifier switching branches or rectifiers, for example, can include processors and memory that can be utilized in the functions according to embodiments of the present disclosure. Thus, all modifications and configurations required for implementing an embodiment of the present disclosure, for example, in existing rectifier switching branches or rectifiers may be performed as software routines, which may be implemented as added or updated software routines. If at least part of the functionality of the present disclosure is implemented by software, such software can be provided as a computer program recorded on a non-transitory computer-readable recording medium (e.g., a non-volatile memory) which, when run on a computer, causes the computer or a corresponding arrangement to perform the functionality according to the present disclosure as described above. Such a computer program may be stored or generally embodied on a computer readable medium, such as a suitable memory, e.g. a flash memory or an optical memory, from which it is loadable to the unit or units executing the program code. In addition, such a computer program code implementing the present disclosure may be loaded to the unit or units executing the computer program code via a suitable data network, for example, and it may replace or update a possibly existing program code.

It is obvious to a person skilled in the art that as technology advances, the basic idea of the present disclosure can be implemented in a variety of ways. Consequently, the present disclosure and its embodiments are not restricted to the above examples, but can vary within the scope of the claims.

It will be appreciated by those skilled in the art that the present invention can be embodied in other specific forms without departing from the spirit or essential characteristics thereof. the presently disclosed embodiments are therefore considered in all respects to be illustrative and not restricted. the scope of the invention is indicated by the appended claims rather than the foregoing description and all changes that come within the meaning and range and equivalence thereof are intended to be embraced therein.

The invention claimed is:

1. A switching branch for a three-level rectifier, the switching branch comprising:
   a first diode and a second diode connected in series between an AC input pole of the switching branch and a positive DC output pole;
   a third diode and a fourth diode connected in series between the AC input pole of the switching branch and a negative DC output pole;
   a first controllable switch connected between a neutral DC output pole and a first connection point between the first diode and the second diode;
   a second controllable switch connected between the neutral DC output pole and a second connection point between the third diode and the fourth diode;
   means for controlling the first controllable switch to be in a conductive state during a reverse blocking state of the first diode and the second diode; and
   means for controlling the second controllable switch to be in a conductive state during a reverse blocking state of the third diode and the fourth diode.

2. The switching branch of claim 1, wherein
   the means for controlling the first switch are configured to control the first switch to be in the conductive state for each entire period of the reverse blocking state of the first diode and the second diode; and
   the means for controlling the second switch are configured to control the second switch to be in the conductive state for each entire period of the reverse blocking state of the third diode and the fourth diode.

3. The switching branch of claim 1, comprising:
   a fifth diode connected in parallel with the first switch; and
   a sixth diode connected in parallel with the second switch.

4. The switching branch of claim 1, wherein the controllable switches are semiconductor switches.

5. A three-phase three-level rectifier comprising three switching branches according to claim 1.

6. A method for controlling a switching branch for a three-level rectifier,
   wherein the switching branch includes a first diode and a second diode connected in series between an AC input pole of the switching branch and a positive DC output pole, a third diode and a fourth diode connected in series between the AC input pole of the switching branch and a negative DC output pole, a first controllable switch connected between a neutral DC output pole and a first connection point between the first and the second diode, and a second controllable switch connected between the neutral DC output pole and a second connection point between the third and the fourth diode, wherein the method comprises:
   controlling the first controllable switch to be in a conductive state during a reverse blocking state of the first diode and the second diode; and
   controlling the second controllable switch to be in a conductive state during a reverse blocking state of the third diode and the fourth diode.

7. The method of claim 6, wherein:
   the controlling of the first switch comprises controlling the first switch to be in the conductive state for each entire period of the reverse blocking state of the first diode and the second diode; and
   the controlling of the second switch comprises controlling the second switch to be in the conductive state for each entire period of the reverse blocking state of the third diode and the fourth diode.

8. The method of claim 6, wherein the switching branch includes a fifth diode connected in parallel with the first switch, and a sixth diode connected in parallel with the second switch.

9. The method of claim 6, wherein the controllable switches are semiconductor switches.

10. A non-transitory computer-readable recording medium having a computer program recorded thereon that causes a processor of a computing device to carry out operations for controlling a switching branch for a three-level rectifier,
    wherein the switching branch includes a first diode and a second diode connected in series between an AC input pole of the switching branch and a positive DC output pole, a third diode and a fourth diode connected in series between the AC input pole of the switching branch and a negative DC output pole, a first controllable switch connected between a neutral DC output pole and a first connection point between the first and the second diode, and a second controllable switch connected between the neutral DC output pole and a second connection point between the third and the fourth diode, and wherein the program causes the processor to carry out operations comprising:
controlling the first controllable switch to be in a conductive state during a reverse blocking state of the first diode and the second diode; and
controlling the second controllable switch to be in a conductive state during a reverse blocking state of the third diode and the fourth diode.

11. The non-transitory computer-readable recording medium of claim 10, wherein:
the controlling of the first switch comprises controlling the first switch to be in the conductive state for each entire period of the reverse blocking state of the first diode and the second diode; and
the controlling of the second switch comprises controlling the second switch to be in the conductive state for each entire period of the reverse blocking state of the third diode and the fourth diode.

12. The non-transitory computer-readable recording medium of claim 10, wherein the switching branch includes a fifth diode connected in parallel with the first switch, and a sixth diode connected in parallel with the second switch.

13. The non-transitory computer-readable recording medium of claim 10, wherein the controllable switches are semiconductor switches.

14. A switching branch for a three-level rectifier, the switching branch comprising:
a first diode and a second diode connected in series between an AC input pole of the switching branch and a positive DC output pole;
a third diode and a fourth diode connected in series between the AC input pole of the switching branch and a negative DC output pole;
a first controllable switch connected between a neutral DC output pole and a first connection point between the first diode and the second diode;
a second controllable switch connected between the neutral DC output pole and a second connection point between the third diode and the fourth diode; and
a control arrangement configured to control the first controllable switch to be in a conductive state during a reverse blocking state of the first diode and the second diode, and to control the second controllable switch to be in a conductive state during a reverse blocking state of the third diode and the fourth diode.

15. The switching branch of claim 14, wherein the control arrangement is configured to control the first switch to be in the conductive state for each entire period of the reverse blocking state of the first diode and the second diode, and to control the second switch to be in the conductive state for each entire period of the reverse blocking state of the third diode and the fourth diode.

16. The switching branch of claim 14, wherein the switching branch comprises:
a fifth diode connected in parallel with the first switch; and
a sixth diode connected in parallel with the second switch.

17. The switching branch of claim 14, wherein the controllable switches are semiconductor switches.

18. A three-phase three-level rectifier comprising three switching branches according to claim 14.

* * * * *